V. J. ODHNER.
CARRIAGE SHIFTING DEVICE FOR CALCULATORS.
APPLICATION FILED AUG. 14, 1919.
1,373,524.
Patented Apr. 5, 1921.
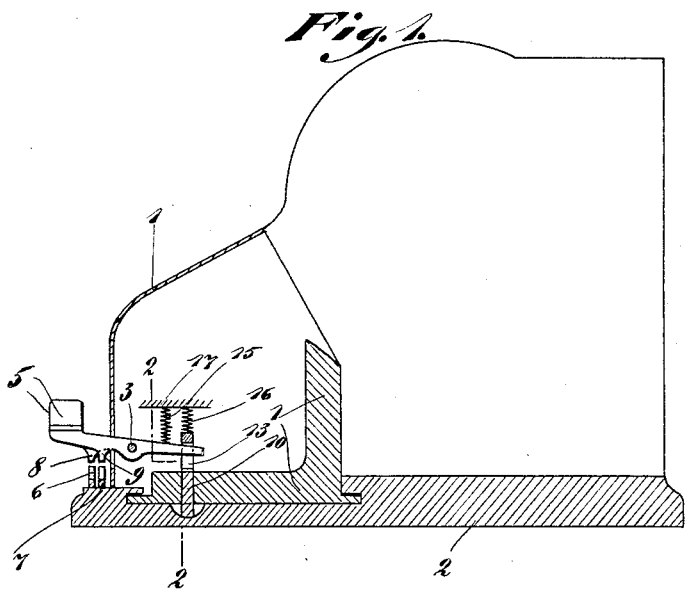
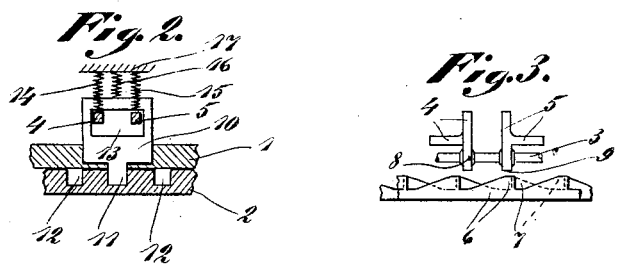 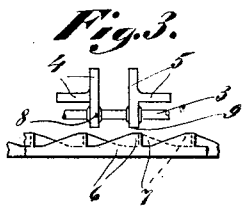
Inventor
V. J. Odhner,
By H. R. Kerslake
Attorney

UNITED STATES PATENT OFFICE.

VALENTIN JAKOB ODHNER, OF GOTTENBORG, SWEDEN.

CARRIAGE-SHIFTING DEVICE FOR CALCULATORS.

1,373,524.  Specification of Letters Patent.  Patented Apr. 5, 1921.

Application filed August 14, 1919. Serial No. 317,542.

*To all whom it may concern:*

Be it known that I, VALENTIN JAKOB ODHNER, a subject of the King of Sweden, and resident of Vasaplatsen 1, Gottenborg, in the Kingdom of Sweden, have invented certain new and useful Carriage-Shifting Devices for Calculators, of which the following is a specification, reference being had therein to the accompanying drawing.

The so called carriage, in calculating machines, which carries the registering wheels and indicating disks must, as well known, be shifted in one or the other direction for bringing the registering wheels in different positions in front of the calculating wheels of the machine for the effecting of a plurality of calculating operations. In accordance with shifting means before used a key or the like is used for disengaging the carriage and moving the same step by step. According to this invention the shifting device is so arranged, that a catching part, which locks the carriage in its different positions, automatically is disengaged while the carriage is moved, so that the said catch, acted upon by a spring or the like, stops the carriage, as it arrives into its new position.

The invention is illustrated in the accompanying drawing. Figure 1 is a cross section of the carriage and a side view of the shifting device. Fig. 2 is a section on the line 2 to 2 of Fig. 1. Fig. 3 shows parts of the shifting device, viewed from the front side of the machine.

1 is the carriage, movable in guides provided in the base plate 2 of the machine. On a pin 3 in the carriage two keys 4 and 5 are swingably mounted, which keys are operated by means of a finger. The part of the keys respectively, against which the finger is forced, is angular and has a horizontal and a vertical branch as shown in Fig. 3. The horizontal branches of the keys extend in opposite directions. Owing to the said arrangement of the keys the carriage may be moved toward the right, Fig. 3, by depressing the key 4 by means of a finger and simultaneously forcing the finger against the vertical branch of the key. In the same manner the key 5 may be depressed by means of the finger and the carriage be moved toward the left. Below the keys two toothed bars 6 and 7 are provided on the base plate of the machine, the teeth of which are turned in opposite directions. A tooth 8 provided on the lower side of the key 4 coöperates with the toothed bar 6, while a tooth 9 provided on the lower side of the key 5 coöperates with the toothed bar 7. The teeth are so positioned, that they permit the keys respectively to be depressed but during the movement of the carriage and the keys toward the right and left respectively, Fig. 3 positively raise the keys respectively. A catch plate 10 is slidably mounted in vertical guides, provided in the carriage 1 and has a tooth 11, which in the different positions of the carriage engages notches 12 respectively, located in a row in the base plate of the machine, along the path of the carriage.. The said plate 10 has an opening 13, through which the keys 4, 5 extend. Springs 14, 15 and 16 bear against the inner arms of the keys respectively and the plate 10 and against an abutment 17 provided in the carriage and tend to move the parts downward, the position of the keys being fixed by an abutment on the casing of the carriage.

The shifting device acts in the following manner. By depressing, for instance, the key 4 and forcing the same toward the right, Fig. 3, the tooth 8 of the said key enters the toothed bar 6, while the said key 4 moves the plate 10 out of engagement with the notch of the base plate 2, so that the carriage may be moved toward the right. During the said movement the tooth 8 of the key 4 slides upward on the subjacent tooth of the bar 6 thus lowering the inner arm of the key 4 and permitting the spring 16 to force the plate 10 downward. As the plate 10 during the movement of the carriage arrives into a position straight above the next notch 12 of the base plate 2, the tooth 11 of the said plate engages the said notch and locks the carriage in its new position. During the depression of the key 5 and the moving of the carriage toward the left, the key moves the plate 10 out of engagement with the base plate 2 and slides upward on the subjacent tooth of the bar 7, thus permitting the plate 10 to lock the carriage at the next notch 12 of the base plate. Consequently, for moving the carriage one step toward the right or left it is necessary only to force the corresponding key downward and laterally, the carriage being then automatically locked in its new position. Consequently, the disengaging of the carriage and the moving of the same are effected through a single manipulation, and contrary to what is the case in machines hitherto used, no attention must be paid to the releasing of the key just at the moment, in which the carriage arrives to its new position in order to permit the tooth of the catching part to engage the corresponding notch. Thus the manipulation of the machine is considerably facilitated by the present shifting means.

The invention may be modified in some respects without exceeding the limits of the invention.

Having now described my invention, what I claim as new and desire to secure by Letters Patent is;

1. In a shifting device for the carriage in calculating machines the combination with a key provided on the carriage for the moving of the same in a certain direction, a locking part movable in the carriage, a stationary part of the machine, with which the said locking part coöperates, the said locking part being disengaged by the key, when depressed, of a stationary toothed bar or the like, extending along the path of the carriage and so located, that the key, when depressed, engages the bar and, as the carriage together with the key is moved, is positively raised by the said bar, so that the locking part is disengaged and thus capable of stopping the carriage in its new position and locking the same.

2. In a shifting device for the carriage in calculating machines the combination with two keys provided on the carriage for the moving of the same in opposite directions, a locking part movable in the carriage, a stationary part of the machine, with which the said locking part coöperates, the said locking part being disengaged by the keys respectively, when depressed, of two stationary toothed bars or the like, which extend along the path of the carriage and the teeth of which are turned in opposite directions, the said bars being so located that the keys respectively, when depressed, engage the bars respectively and, as the carriage together with the keys is moved in one and the other direction respectively are positively raised by the said bars respectively, so that the locking part is disengaged and thus capable of stopping the carriage in its new position and locking the same.

In witness whereof, I have hereunto signed my name.

VALENTIN JAKOB ODHNER.